United States Patent
Hehl

(10) Patent No.: US 7,469,605 B2
(45) Date of Patent: Dec. 30, 2008

(54) DEVICE AND METHOD FOR DETECTING A FORCE ON AN INJECTION MOULDING MACHINE

(76) Inventor: Karl Hehl, Arthur-Hehl-Strasse, Lossburg (DE) D-72290

( * ) Notice: Subject to any disclaimer, the term of this patent is extended or adjusted under 35 U.S.C. 154(b) by 0 days.

(21) Appl. No.: 11/916,280

(22) PCT Filed: Jun. 11, 2006

(86) PCT No.: PCT/EP2006/005548

§ 371 (c)(1),
(2), (4) Date: Dec. 1, 2007

(87) PCT Pub. No.: WO2006/133860

PCT Pub. Date: Dec. 21, 2006

(65) Prior Publication Data

US 2008/0156113 A1  Jul. 3, 2008

(30) Foreign Application Priority Data

Jun. 13, 2005  (DE) .................. 10 2005 027 264

(51) Int. Cl.
*G01L 1/02* (2006.01)

(52) U.S. Cl. .................. 73/862.582; 73/862.583; 73/862.381; 264/40.1; 264/40.3; 264/40.4

(58) Field of Classification Search .......... 73/862.381, 73/862.582, 862.583; 264/40.1, 40.3, 40.4
See application file for complete search history.

(56) References Cited

U.S. PATENT DOCUMENTS 3,840,312 A * 10/1974 Paulson et al. ............. 425/149
5,229,952 A *  7/1993 Galloway et al. ........... 700/200
5,472,331 A * 12/1995 Watkins ..................... 425/149

(Continued)

FOREIGN PATENT DOCUMENTS

DE     101 35 516    6/2002

(Continued)

*Primary Examiner*—Edward Lefkowitz
*Assistant Examiner*—Freddie Kirkland, III
(74) *Attorney, Agent, or Firm*—Cantor Colburn LLP

(57) ABSTRACT

The invention relates to a device and method for detecting a force on an injection moulding machine for processing plastic materials. According to said invention, a first element (100) interacting with a mechanical drive and movable at least indirectly thereby in a direction of movement (x) is displaced during said displacement with respect to a second element (200) positioned near the first element (100) or oppositely thereto. A force measuring device (D) is used for determining the force applied on the first (100) and/or second (200) element by the actuation of the injection moulding machine produced by the relative displacement thereof between the first (100) and second (200) elements. A hydraulic chamber whose size is modifiable during the relative displacement associated with a change in pressure of a fluid medium in said hydraulic chamber is firmed between the first (100) and second (200) elements, wherein said change in pressure forms an input signal for adjusting the force or pressure and a pressure-relief valve (30) is used for bypassing the hydraulic medium to a hydraulic medium container (35), when the predetermined or predeterminable presser is exceeded in the hydraulic chamber (10), thereby making it possible to obtain a device and method for detecting a force on an injection moulding machine which makes it possible to determine said force in a favourable alternative manner and simultaneously ensure an overload protection.

13 Claims, 4 Drawing Sheets

U.S. PATENT DOCUMENTS

| | | | |
|---|---|---|---|
| 5,656,228 A * | 8/1997 | Fujii et al. | 264/328.13 |
| 6,143,215 A * | 11/2000 | McCollum et al. | 264/40.1 |
| 6,309,571 B2 * | 10/2001 | Gao et al. | 264/40.1 |
| 6,379,141 B1 * | 4/2002 | Kawasaki et al. | 425/139 |
| 6,623,672 B2 * | 9/2003 | McCollum et al. | 264/40.1 |
| 6,795,753 B2 * | 9/2004 | Vanderhoof et al. | 700/301 |
| 2004/0142057 A1 | 7/2004 | Kao | |

FOREIGN PATENT DOCUMENTS

| | | |
|---|---|---|
| DE | 203 08 114 | 9/2003 |
| DE | 103 37 551 | 3/2006 |
| EP | 752 303 | 1/1997 |
| EP | 1275 487 | 1/2003 |
| JP | 63 009524 | 1/1988 |
| JP | 2003 048238 | 6/2003 |
| JP | 06 023813 | 4/2004 |

\* cited by examiner

DEVICE AND METHOD FOR DETECTING A FORCE ON AN INJECTION MOULDING MACHINE

CROSS REFERENCE TO RELATED APPLICATIONS

The present application claims the priority of German application 10 2005 027 264.9, filed on Jun. 13, 2005, the disclosure content of which is hereby expressly also made the object of the present invention.

TECHNICAL FIELD OF THE INVENTION

The invention relates to a device and a method for detecting a force of at least one mechanical drive on an injection molding machine for processing plastics materials and other plasticisable compounds such as pulverent and/or ceramic compounds.

BRIEF DESCRIPTION OF RELATED ART

A device of this type and a method of this type are for example known in PATENT ABSTRACTS OF JAPAN, Band 2003, No. 06, Jun. 3, 2003 (2003-06-03) und JP 2003 048238 A in the form of a load cell, wherein a hydraulic chamber is provided between two components, the pressure change of which chamber is detected for detecting the force on an injection unit of an injection molding.

Furthermore, a pressure-relief valve on a servo motor is known in PATENT ABSTRACTS OF JAPAN, Band 018, No. 229 (M-1598), Apr. 26, 1994 (1994-04-26) und JP 06 023813 A in connection with an injection molding machine to provide an overload protection to drain hydraulic medium into a hydraulic medium container when a predetermined pressure in the hydraulic chamber is exceeded.

Similar devices are known in PATENT ABSTRACTS OF JAPAN; Band 012, No. 206 (M708), Jun. 14, 1988 (1988-06-14) und JP 63 009524 A and DE 101 35 516 A1.

DE 203 08 114 U1 shows a control device for detecting a force of a spindle in particular of an injection molding machine comprising an injection drive device for an injection unit, which rotates a threaded spindle as one component relative to the threaded spindle nut as an additional component. A force detection component is secured to the threaded spindle nut such that the injection force is detected and can be compared with a predetermined injection force, thus controlling the injection force in this manner. This means that the force transducer is preferably decoupled from the spindle support means. This means that, compared to previously known load cells and force transducers, the injection force is said to be determined in a more accurate manner as, otherwise, on account of the disposition of the force transducer, for example on the servomotor, it is difficult to detect the actual force because of interposed mechanical parts and the friction that is present.

DE 103 37 551 A1 makes known a pressure measuring device for an injection molding machine, where a resiliently deformable force transferring member of a load detector is added into the force path between lift drive and plasticizing screw as an integral component of a transmission element of the lift drive. The force transferring member is deformed in a resilient manner under load by it being axially compressed and its diameter being expanded. The change in length and thickness is measured in a contact-free manner to detect the force.

EP 1 275 487 A1 makes known such a pressure measuring device where there is provided a support body which relieves the load from the machine part that is monitored by the sensor when the detected closing or injection pressure exceeds a specific value amounting to less than half of its maximum value in order to avoid the sensors becoming overloaded.

According to EP 0 752 303 B1 a force transducer is secured by means of bolts to a threaded nut which is connected to a threaded spindle and to a rear plate which is penetrated by the threaded spindle. The force transducer, consequently impinged upon by bending, can provide deforming-dependent values, which are detected directly at the end of the spindle and, consequently, are free of additional forces as extensively as possible. The relative displacement that occurs in the region of the force transducer is based on the fact that the spindle, running in a nut that is mounted in a non-rotational manner, transfers the axial force of the spindle, to which is opposed the tensile force of the bolts with which the force transducer is retained on the rear plate. On account of the deforming of the bolts, which is caused by the differences and the inertia of the axial force and the tensile force, the measured axial force does not correspond to the actual value.

US 2004/0142057 A1 makes known a device for measuring the internal mould pressure in an injection molding machine. The size of the mould cavity changes as the pressure of the medium situated in the chamber changes, the change in pressure being an input signal for controlling the pressure or force.

BRIEF SUMMARY OF THE INVENTION

Proceeding from the said state of the art, the invention creates a device and a method for detecting a force on an injection molding machine, the device and method enabling a favorable alternative force detection and simultaneous overload prevention.

A hydraulic chamber is provided between components that are adjacent to each other or abut against each other without there being any need to provide an additional load cell or a force transducer. The pressure in the hydraulic chamber is measured and serves as an input signal for controlling the pressure or force. Consequently, the force detecting process is free from the deforming of other components, for example components provided for securing the force transducer, as the hydraulic chamber is "incorporated" between the components themselves. At the same time, the reduction in the hydraulic pressure can be determined as extensively freely as possible in an individual manner by means of the size of the faces impinged upon during the relative displacement. The system can be used in this manner not only for detecting the injection force but also for detecting the most varied forces on an injection molding machine, both on the mould closing side and on the injection molding side. It can also be used in conjunction with the most varied mechanical drives as long as a displacement is effected in a direction of displacement in the direction of the relative displacement of the two components. This means that the system can also be used, for example, in linear drives or even to detect the yield position of toggle mechanisms, more especially when the detecting is effected, for example, in the end position of the toggle mechanism.

In addition, overload prevention is guaranteed at the same time by limiting the pressure of the hydraulic medium provided in the hydraulic chamber. In the case of mechanical drives, there is namely frequently the risk that when the moveable components come into contact with, for example, a mechanical end stop, very steep increases in force are created that cannot be easily absorbed on account of the mass inertias present and can, consequently, sometimes lead to damage to the mechanical drive system, such as for example the spindles. In the case of the solution according to the invention the hydraulic medium initially continues to build up the pressure when external forces arise, the pressure being used by means of a pressure transducer for controlling pressure and force. In addition, when a maximum admissible pressure is exceeded, hydraulic medium can be diverted in the short term from the hydraulic chamber into a hydraulic medium container such that the components, on account of a displacement buffer space preferably present there, can move mechanically relative to one another in order thereby to protect the mechanical drive. Once this overload situation starts—basically also at each new cycle—according to an additional specific embodiment, the pump system can restore the initial state, that-is-to-say return the components into the original mechanical state or respectively calibrate the system again to the initial state.

A toggle drive in conjunction with the limiting force can also be used as the mechanical drive. This simplifies, for example, the dimensionally precise establishment of the yield position on the tensioned tool, by achieving force limiting through draining off the oil. Consequently, a controlled closing force is possible at the same time without the need for mechanical adjustment.

Further advantages are produced from the additional subclaims and the following description.

BRIEF DESCRIPTION OF THE FIGURES

The invention is described in more detail below by way of the enclosed Figures, in which.

DETAILED DESCRIPTION OF THE INVENTION

The invention is now described in more detail, as an example, with reference to the attached drawings. However, the exemplified embodiments are only examples which are not to restrict the inventive concept to one specific disposition.

Before the invention is described in detail, it must be pointed out that the invention is not restricted to the respective components of the device or the respective method steps, as the said components and method can vary. The terms used in this case are simply used to describe certain specific embodiments and are not used in a restricting manner. If the singular or indefinite articles are used in the description and in the claims, these also refer to the plural of the same elements as long as the overall context does not make something to the contrary clear.

The Figures show a device for detecting a force of at least one mechanical drive A on an injection molding unit S of an injection molding machine for processing plastics materials and other plasticisable compounds such as pulverent and/or ceramic compounds. The injection molding unit S provides only one exemplified embodiment as the device can basically be used at arbitrary positions on or in conjunction with an injection molding machine, for example, even on the mould closing side. In the same way, the method described below can basically be operated in the most varied regions on an injection molding machine or on its peripheral equipment.

Figure 1:
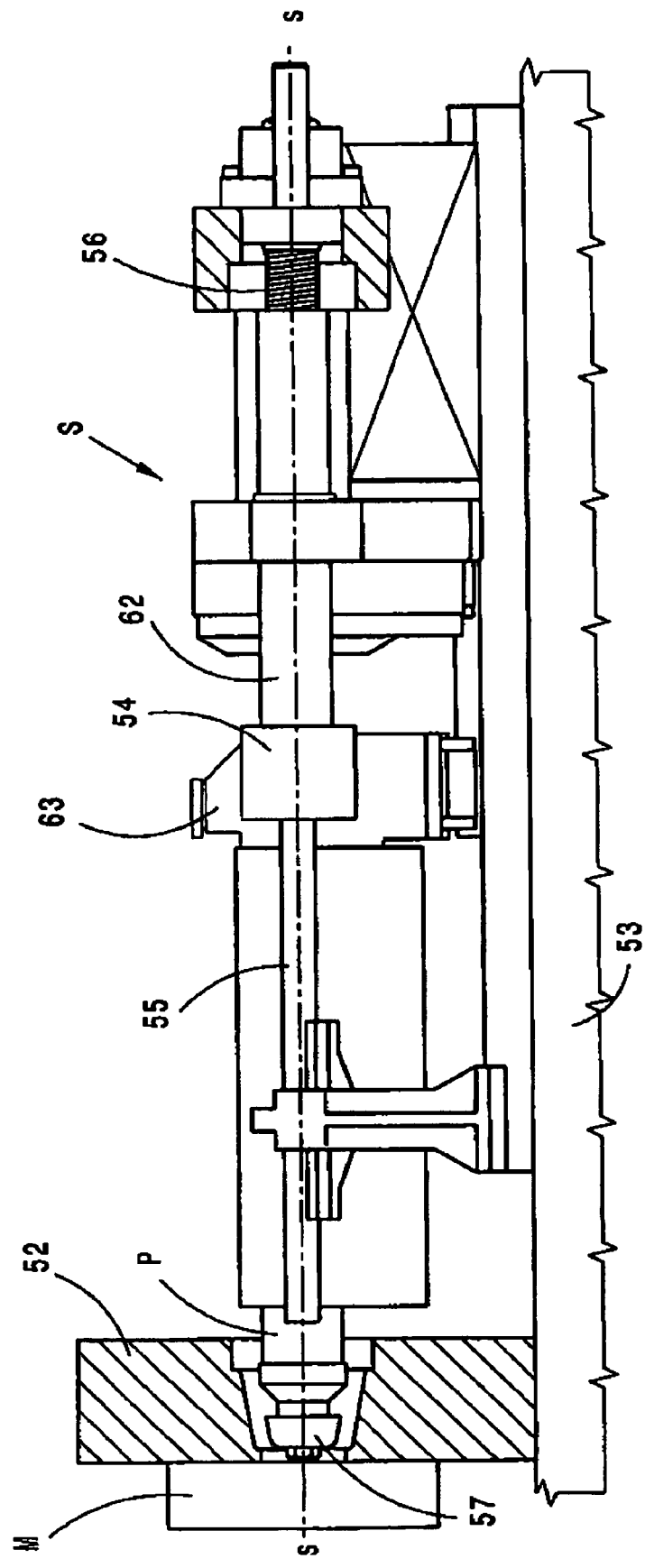
FIG. 1 is a side view of an injection molding unit of an injection molding machine.
Figure 2:
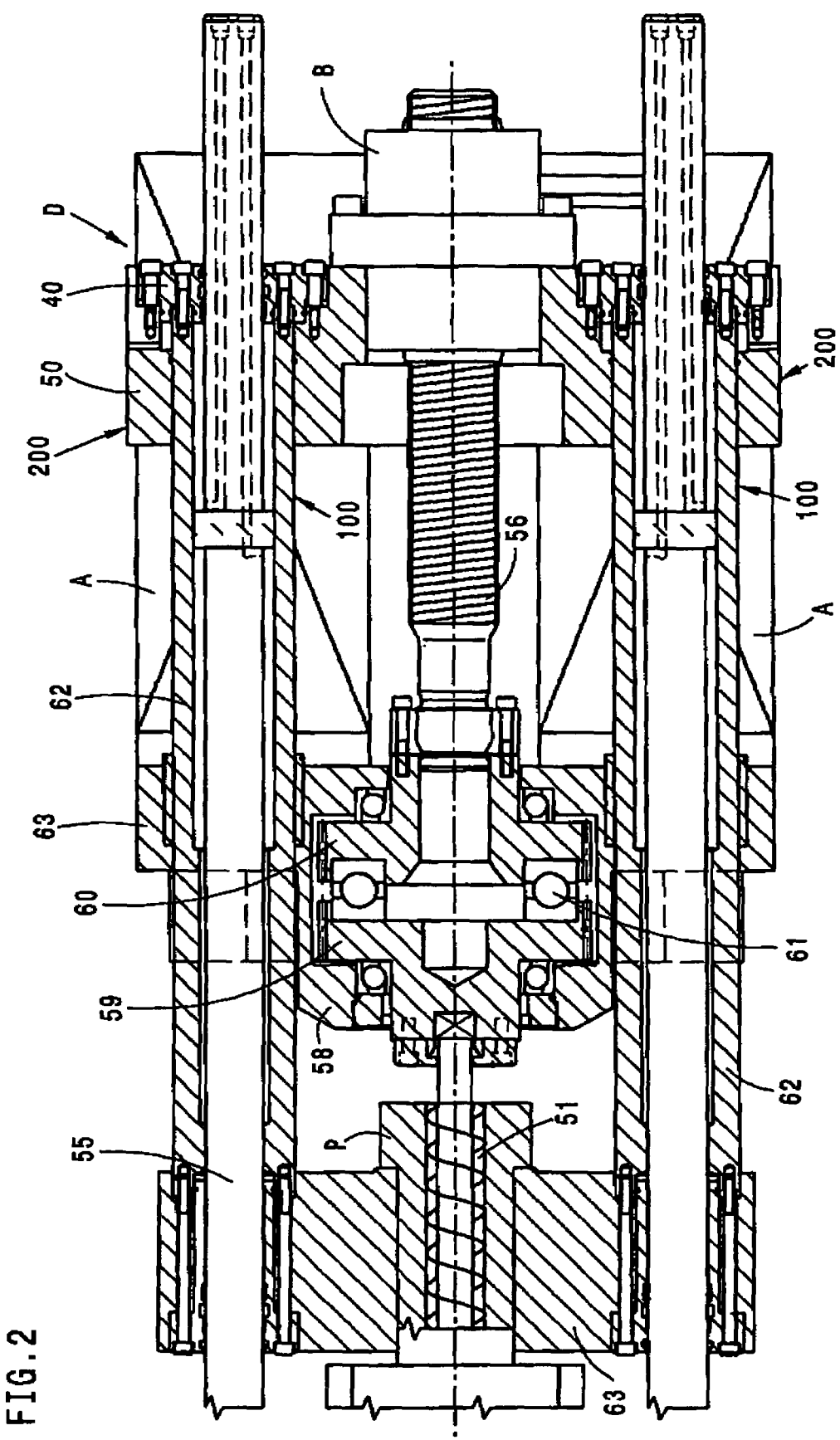
FIG. 2 is a horizontal section at the level of the axis of injection s-s in FIG. 1 through the injection molding unit.

According to FIGS. 1 and 2, when the compounds to be plasticized are being processed, the raw material is supplied to the plasticizing cylinder P, where it is plasticized and by means of a feeding means 51 such as, for example, a feed screw is fed in a cyclical manner along the axis of injection s-s into the mould cavity of an injection molding tool M. A plurality of mechanical drives A associated with the carrier body 63 are provided on the injection molding unit S, the mechanical drives serving to apply the nozzles 57 to the mould carrier 52 or respectively the tool M by means of the spindle 56 or respectively to rotate the feeding means 51 or for displacing the feeding means in an axial manner. This is effected in a known manner in cyclical movements of the injection member 58 that is connected to the feeding means 51 by two drive elements 59, 60, which are rotatable independent of one another, being driven by the mechanical drives A to obtain the rotational movement and also the axial movement of the feed screw. The spindle 56 is driven by the drives directly by means of the drive element 60, the spindle interacting with the stationary spindle nut B or respectively effecting the rotating of the feeding means 51. The precise design of the components is not gone into in any more detail here as it is known from the state of the art. Alternative types of drive are also known to the expert.

A force frame is formed between the injection bridge 50 and the carrier body 63 by means of the tubes 62, to which frame, according to the invention, the function of a force detecting means and at the same time an overload preventing means is allocated through the effect of the force between the carrier body 63 and the injection bridge 50, as is described in more detail below. At the same time, the tubes 62 form the cylinders of a piston/cylinder unit, the piston rod of which is formed by guide braces 55 and which serves as a hydraulic unit for applying the nozzles 57 to the mould M or respectively to the injection mould.

Forces between carrier body 63 and injection bridge 50, retained by means of the tubes 62, are created in the form of back pressure by rotating the drive element 59 or namely in the form of injection force by rotating the drive element 60 by means of spindle 56. Above all, in the case of the said two functions, stresses are applied to the force frame, which, both in the case of back pressure forces that are created when the feeding means 52 is displaced or respectively rotated, and also in the case of injection forces, work on a hydraulic chamber 10 that can be seen in FIGS. 3 and 4. In addition, during the injection process there is a force working that is transferred as far as the injection bridge 50 on the one side via the drive elements 59, 60 as well as the axial bearing 61 and the spindle 56. The forces are to be detected in the embodiment by the force detecting device D.

Figure 3A:
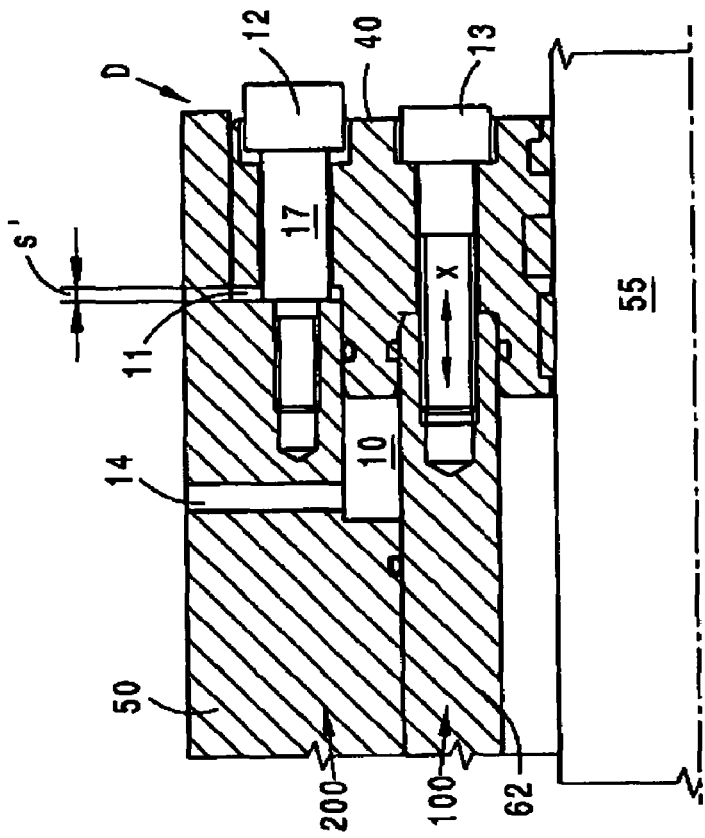
FIG. 3a is a representation as in FIG. 3 in the situation of an overload.
Figure 3:
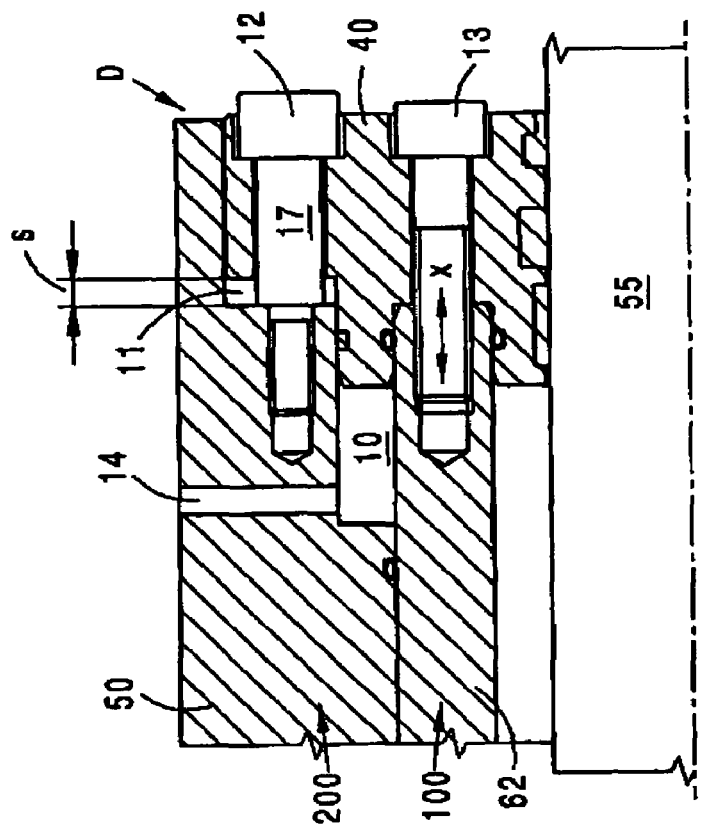
FIG. 3 is an enlarged cutout from FIG. 2 in the region of the force detecting device D.
Figure 4:
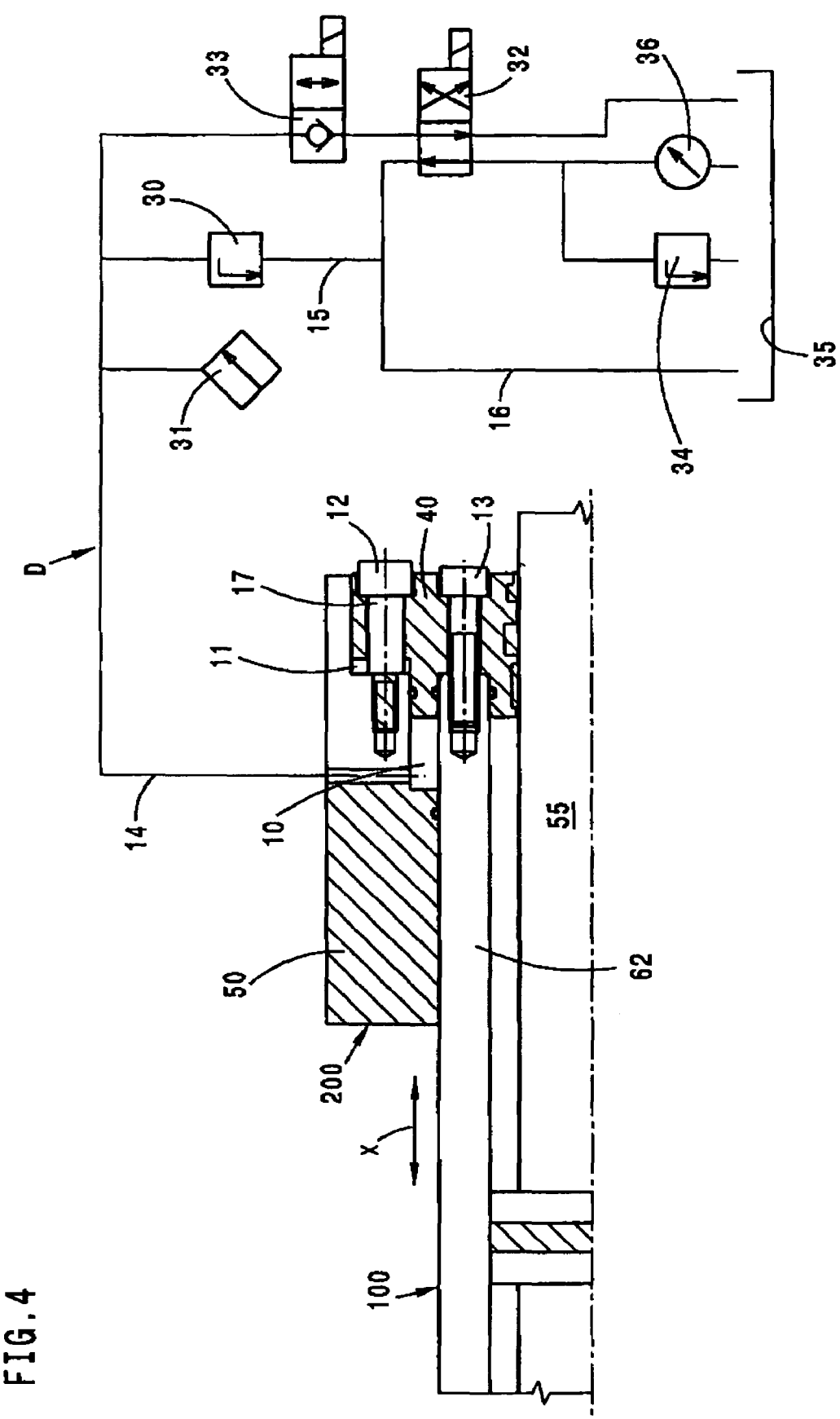
FIG. 4 is a schematic representation of the hydraulic device associated with the force detecting device D.

FIGS. 3 and 4 show an enlarged cutout from FIG. 2 in the region of the force detecting device D. The device detects a force, in the embodiment, for example, the injection force. To this end, there is provided a first component 100, which interacts with at least one mechanical drive A and is displaced at least indirectly by the mechanical drive in a direction of displacement x and is formed in the embodiment by the tube 62. In addition thereto, there is provided at least one additional component 200, which is displaced during the movement relatively to the first component and which is adjacent the first component 100 or abuts against the first component. The force detecting device D for detecting the force that acts upon the first component 100 and/or on the additional component 200 following the activation of the injection molding machine is connected to the two components such that the force can be determined by determining the relative displacement between the first component 100 and the additional component 200 when the components deform resiliently in an elongated manner.

For this purpose, the hydraulic chamber 10 is formed between the first component 100 and the additional component 200, the size of the hydraulic chamber changing during the relative displacement through the change in pressure of the hydraulic medium that is situated in the hydraulic chamber. The change in pressure occurring in this case serves as an input signal for controlling the force or pressure preferably of the mechanical drive A. During normal operation, the hydraulic chamber 10 is impinged upon with pressure from the hydraulic container 35 by means of a pump 36 in such a manner that the components abut against a mechanical stop member, that-is-to-say, in the embodiment the force frame (injection bridge 50, pipes 62, carrier body 63) is closed by means of the hydraulic medium in the hydraulic chamber 10. To this end, the hydraulic medium is preferably at least partially hydraulically pre-stressed. If there is a relative displacement between the first component 100 and the second component 200, which, in the embodiment, is formed by the injection bridge 50, this results in a change in pressure, which is detected by the pressure sensor 31 and is used again for controlling the pressure or force. However, if a pressure that is predetermined or predeterminable by means of a pressure relief valve 30 is exceeded in the hydraulic chamber 10, it is possible to drain hydraulic medium into the hydraulic medium container 30 via the lines 15 and 16.

The hydraulic chamber 10 is defined by the first component 100 and the additional component 200 as well as a piston-type element 40, which is mounted on the first component 100 and/or on the additional component 200 in a sealing manner to form the hydraulic chamber. In the operating state, the piston-type element 40 is displaced as a piston in the hydraulic chamber 10, the injection bridge 50 serving at the same time as a cylinder. In the embodiment the piston-type element 40 is fixedly connected to the first component 100, that is to the tube 62, as an alternative it could be fixedly connected to the additional component 200. Consequently, through the securement by means of the securing means 13, it forms a part of the component 100.

At the other end, the piston-type element 40, which in the embodiment is preferably an annular piston that surrounds the guide brace 55, is connected to the injection bridge 50 by means of the securing means 12, but is axially displaceable relative to the injection bridge on account of the distance sleeve 17, a displacement buffer space 11 being provided for the displacement. In FIG. 3, the displacement buffer space has the axial extension s, which in the normal case during normal operation is kept upright. However, if an overload should occur, by the mechanical drive or a component of the injection molding machine or a mould running onto an end stop member, this leads to an inadmissible rise in pressure and, as a result of this, to a displacement of the additional component 200 that is the injection bridge 50 in FIG. 3 to the right. This means that the hydraulic chamber 10 is made smaller such that the pressure exceeds the predetermined or predeterminable limit value of the pressure relief valve 30 and hydraulic medium is drained off. This results in the utilization of the displacement buffer space 11 as in FIG. 3a, the axial extension s' in FIG. 3a having been reduced to half.

Through the said overload preventing in conjunction with the simultaneous force detecting, the mechanical drive A, whatever the design, can be protected from the overload. Once this overload has occurred, it is the job of the hydraulic system to reset the system. This is effected by the pump 36 restoring the original mechanical state by means of the cross mounting of the valve 32, namely the resetting of the displacement buffer space 11 to the original state, which is obtained by means of the stop member of the piston-type element 40 on the securing means 12.

The hydraulics are not necessary for the function of measuring the pressure in line 14 using the pressure sensor 31. This is a passive system. The hydraulics overall, however, are preferably needed to produce an absolutely identical initial state at the start of the cycle during the measuring process.

During the measuring process, the hydraulic medium is stressed by means of the non-return valve 33. The pressure is measured using pressure sensor 31 and the overload preventing is produced using pressure relief valve 30. The start condition for the additional or respectively next measuring process is produced by the system being moved into the original position by means of the pump 36 and valve 32 via non-return valve 33 by means of a limiting pressure 34. The final step is briefly switching the valve 32 so that the pressure is equalized absolutely at zero, which is necessary so that the overall measuring range of zero force to maximum force can be utilized. Without this final step, that-is-to-say if it is started at a certain pre-stressed pressure, there is the risk of the system not initially detecting anything until reaching the corresponding force that corresponds to the pre-stressed pressure. The function of the restoration of the basic function after each cycle is also useful without the overload preventing means having been addressed in order to create absolutely identical conditions.

Any drive that produces a mechanical displacement in any way whatsoever can be considered as the mechanical drive. Such mechanical drives can be all types of spindle drives but also linear motors or servo-controlled drives. A spindle driven by means of a hydraulic motor is also conceivable as this must also be protected from an overload. Electromechanical drives can also be added, but also force detecting using a toggle mechanism is conceivable if it is more especially a question of detecting the force in a yield position. The system is economical and additionally offers the advantage of it being possible to reduce the hydraulic pressure on an individual basis by selecting, in a corresponding manner, the size of the face of the piston-type element 40 that is impinged upon during the axial movement.

It is obvious that this description can be subject to the most varied modifications, changes and adaptations, which are viewed in the area of equivalents to the attached claims.

The invention claimed is:

1. Device for detecting a force on an injection molding machine for processing plastics materials and other plasticisable compounds, said device comprising:
    at least one first component, which interacts with at least one mechanical drive, which is displaced at least indirectly by the mechanical drive in a direction of displacement and is displaced during the displacement relatively to at least one additional component of the injection molding machine, the additional component being adjacent the first component, and
    at least one force detecting device for detecting the force acting on at least one of the first component and the additional component due to an activation of the injection molding machine as a result of the relative displacement between the first component and the additional component, a hydraulic chamber being formed between the first component and the additional component, the size of the hydraulic chamber changing during the relative displacement by means of a change in the pressure of a hydraulic medium situated in the hydraulic chamber, wherein the change in pressure is an input signal for controlling a force or a pressure, wherein a pressure-relief valve is provided for diverting hydraulic medium into a hydraulic medium container when a predetermined or predeterminable pressure is exceeded in a hydraulic chamber, wherein the hydraulic chamber is defined by the first component and the additional component and by a piston-type element, which is mounted on one of the first component and the additional component in a manner sealing the hydraulic chamber and wherein the piston-type element is displaceable in the direction of displacement of the first component if the predetermined or predeterminable pressure of the hydraulic medium is exceeded in the hydraulic chamber.

2. Device according to claim 1, wherein the piston-type element is fixedly connectable to the first component or to the additional component to form a part of the same.

3. Device according to claim 1, wherein the hydraulic medium in the hydraulic chamber is hydraulically pre-stressed.

4. Device according to claim 1, wherein the drive is a linear displacement element or a component of a linear drive or a spindle drive that is directly connected to the linear displacement element.

5. Device according to claim 1, wherein the drive toggle drive.

6. Device according to claim 1, wherein the additional component is an injection bridge for a feeding element of the injection molding machine.

7. Method for detecting a force on an injection molding machine for processing plastics materials and other plasticisable compounds, said method comprising:

displacing at least one first component by means of at least one drive in a direction of displacement (x) relative to at least one additional component of the injection molding unit, the additional component being adjacent the first component, detecting the force acting on at least one of the first component and the additional component as a result of the relative displacement between the first component and the additional component in forming a hydraulic chamber between the first component and the additional component and determining the change in pressure of a hydraulic medium situated in the hydraulic chamber during the relative displacement;

using the determined change in pressure as an input signal for controlling the pressure or force, limiting the pressure in the hydraulic chamber to a predetermined or predeterminable pressure and discharging the hydraulic medium out of the hydraulic chamber, if the predetermined or predeterminable pressure is exceeded, and mounting a piston-type element defining the hydraulic chamber on at least one of the first component and the additional component in a manner sealing the hydraulic chamber such that the piston-type element is displaceable in the direction of displacement of the first component if a predetermined or predeterminable pressure of the hydraulic medium is exceeded in the hydraulic chamber.

8. Method according to claim 7, wherein hydraulic medium is discharged out of the hydraulic chamber by opening a defined displacement buffer space of the first component and of the additional component relative to each other.

9. Method according to claim 7, further comprising a cyclical calibration of the pressure in the hydraulic chamber to an initial value.

10. Method according to claim 7, further comprising hydraulically resetting at least one of the first component and the additional component into its initial state after detecting the force in a preferably cyclical manner.

11. Method according to claim 7, wherein a spindle drive, a linear drive, a spindle with hydraulic drive or a toggle drive is used as the drive.

12. Method according to claim 7, wherein an input signal is used for controlling the pressure or force of the drive.

13. Method according to claim 7, wherein the force acting on at least one of the first component and the additional component is detected as a result of the relative displacement between the first component and the additional component by the components deforming in an elongated manner.

* * * * *